US 8,275,350 B2

(12) United States Patent
Daly et al.

(10) Patent No.: US 8,275,350 B2
(45) Date of Patent: Sep. 25, 2012

(54) SYSTEMS AND METHODS FOR MAPPING COMMERCIAL MOBILE ALERT SERVICE MESSAGE ATTRIBUTES TO A CELL BROADCAST INTERFACE

(75) Inventors: Brian K. Daly, Seattle, WA (US); Dewayne Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 218 days.

(21) Appl. No.: 12/571,709

(22) Filed: Oct. 1, 2009

(65) Prior Publication Data
US 2011/0081882 A1    Apr. 7, 2011

(51) Int. Cl.
*H04M 11/04* (2006.01)
(52) U.S. Cl. ............... 455/404.1; 455/412.2; 455/414.1; 455/466
(58) Field of Classification Search ............... 455/404.1, 455/466, 2, 412.2; 379/33, 37, 45
See application file for complete search history.

(56) References Cited

U.S. PATENT DOCUMENTS

| | | | |
|---|---|---|---|
| 2004/0103158 | A1 | 5/2004 | Vella et al. |
| 2006/0040639 | A1 | 2/2006 | Karl et al. |
| 2009/0117923 | A1* | 5/2009 | Berger et al. ............ 455/466 |
| 2010/0124898 | A1* | 5/2010 | Qu et al. ............ 455/404.1 |

FOREIGN PATENT DOCUMENTS
WO    WO 2011/041365    4/2011

OTHER PUBLICATIONS

International Patent Application No. PCT/US2010/050656: International Search Report dated Jan. 13, 2011, 12 pages.
Daly, et al., "Commercial Mobile Alert Service (CMAS) Section 8.1, 8.2 & 8.3 of the CMAS Via GSM/UMTS Cell Broadcast Service Specification," 3GPP2-Drafts, 2500 Wilson Boulevard, Suite 300, Arlington, VA 22201, USA, Mar. 2008, 1-10, XP040479625.
Daly, et al., "Commercial Mobile Alert Service (CMAS) Functional Architecture ad Interfaces for GSM/UMTS," 3GPP2-Drafts, 2500 Wilson Boulevard, Suite 300, Arlington, VA 22201, USA, Mar. 2008, 1-3, XP040487550.
Musgrove, "Commercial Mobile Alert Service (CMAS) Standards Deliverables and Work/Meeting Schedules," 3GPP2-Drafts, 2500 Wilson Boulevard, Suite 300, Arlington, VA 22201, USA, May 9, 2008, 1-8, XP040479849.
Tia, "Commercial Mobile Alert Service (CMAS) Over CDMA Systems," vol. TIA-1149.0, Jul. 1, 2009, 1-44, XP002611688.
Patwardhan, "CMAS E-Interface Parameters Over 1x SMS," Montreal, Canada, Apr. 2008, 1-6, XP002611689.

(Continued)

*Primary Examiner* — Kathy Wang-Hurst
(74) *Attorney, Agent, or Firm* — Woodcock Washburn LLP

(57) ABSTRACT

Cell broadcast protocols are used to distribute emergency alerts to mobile devices. Emergency alerts may be received from an emergency provider or governmental agency. Parameters of an emergency alert may be derived and mapped to parameters of a cell broadcast message, which may then be transmitted to mobile devices. In one embodiment, attributes of an emergency alert are mapped to a first parameter of a cell broadcast message, and the contents of the emergency alert are mapped to the first parameter of the cell broadcast message. If the contents of the emergency alert exceed the available space in the first parameter, the remaining contents of the emergency alert are mapped to a second parameter of the cell broadcast message.

18 Claims, 8 Drawing Sheets

OTHER PUBLICATIONS

Verizon Wireless, "CMAS Standardization Consideration," 3GPP2-Drafts, 2500 Wilson Boulevard, Suite 300, Arlington, VA 22201, USA, 2008, 1-8, XP040479475.

"3$^{rd}$ Generation Partnership Project; Technical Specification Group Core Network and Terminals; Technical Realization of Cell Broadcast Service (CBS) (Release 9)" 3GPP Standard; 3GPP TS 23.041, 3$^{rd}$ Generation Partnership Project (3GPP), Mobile Competence Centre; 650 Route des Lucioles; F-06921 Sophia-Antipolis Cedex; France, vol. C, No. V9.1.0, Sep. 1, 2009, 1-44, XP050362190.

"3$^{rd}$ Generation Partnership Project; Technical Specification Group Services and System Aspects Public Warning System (PWS) Requirements (Release 9)," 3GPP Standard; 3GPP TS 22.268, 3$^{rd}$ Generation Partnership Project (3GPP), Mobile Competence Centre; 650 Route des Lucioles; F-06921 Sophia-Antipolis Cedex; France, No. V9.2.1, Jun. 1, 2009, 1-13, XP050361307.

* cited by examiner

SYSTEMS AND METHODS FOR MAPPING COMMERCIAL MOBILE ALERT SERVICE MESSAGE ATTRIBUTES TO A CELL BROADCAST INTERFACE

BACKGROUND

The Commercial Mobile Alert System (CMAS) was established by the Federal Communications Commission (FCC) to allow wireless service providers to send emergency alerts to their subscribers. Such alerts are initially intended to be in the form of text messages, but may also take the form of audio and video alerts. The CMAS network will allow emergency service agencies, such as the Federal Emergency Management Agency (FEMA), to accept and aggregate alerts from federal, state, and local emergency operations centers, and send the alerts over a secure interface to wireless providers. The wireless providers can then distribute the alerts to their customers.

While the FCC has proposed and adopted the network structure, technical requirements, and operating procedures for the CMAS, wireless service providers that participate in the CMAS must develop their own systems to receive alerts from FEMA and distribute them to their customers. Such systems must allow the wireless service providers to target individual geographical areas, such as counties, for distribution of emergency alerts. Attributes of CMAS messages may be used by wireless service providers and user devices for various functions.

There are currently three types of emergency alerts. Presidential Alerts relate to national emergencies, Imminent Threat Alerts relate to emergencies where life or property is at risk, such as hurricanes or tornadoes, and Child Abduction Emergency/AMBER Alerts relate to missing or endangered children due to an abduction or runaway situation. Subscribers may be able to opt-out of receiving Imminent Threat and Child Abduction/AMBER alerts, but may not be permitted to opt-out of Presidential Alerts.

SUMMARY

Systems and methods are disclosed for receiving an emergency alert, mapping fields and/or parameters of the emergency alert to a cell broadcast message, and transmitting the cell broadcast message to user devices. In one embodiment, attributes of an emergency alert may be mapped to a first parameter of a cell broadcast. Contents of the emergency alert may then be mapped to the remaining space in the first parameter. If the contents of the emergency alert do not fit entirely into the first parameter with the emergency alert attributes, then the remaining contents may be mapped to a second parameter of the emergency alert. Other embodiments and aspects of the present disclosure are also described herein.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

In one embodiment, CMAS emergency alerts may be provided using Universal Mobile Telecommunications System (UMTS) and/or Global System for Mobile communications (GSM) cell broadcast technologies. This disclosure provides methods and systems for mapping of emergency alert attributes to a cell broadcast message.

Figure 1:
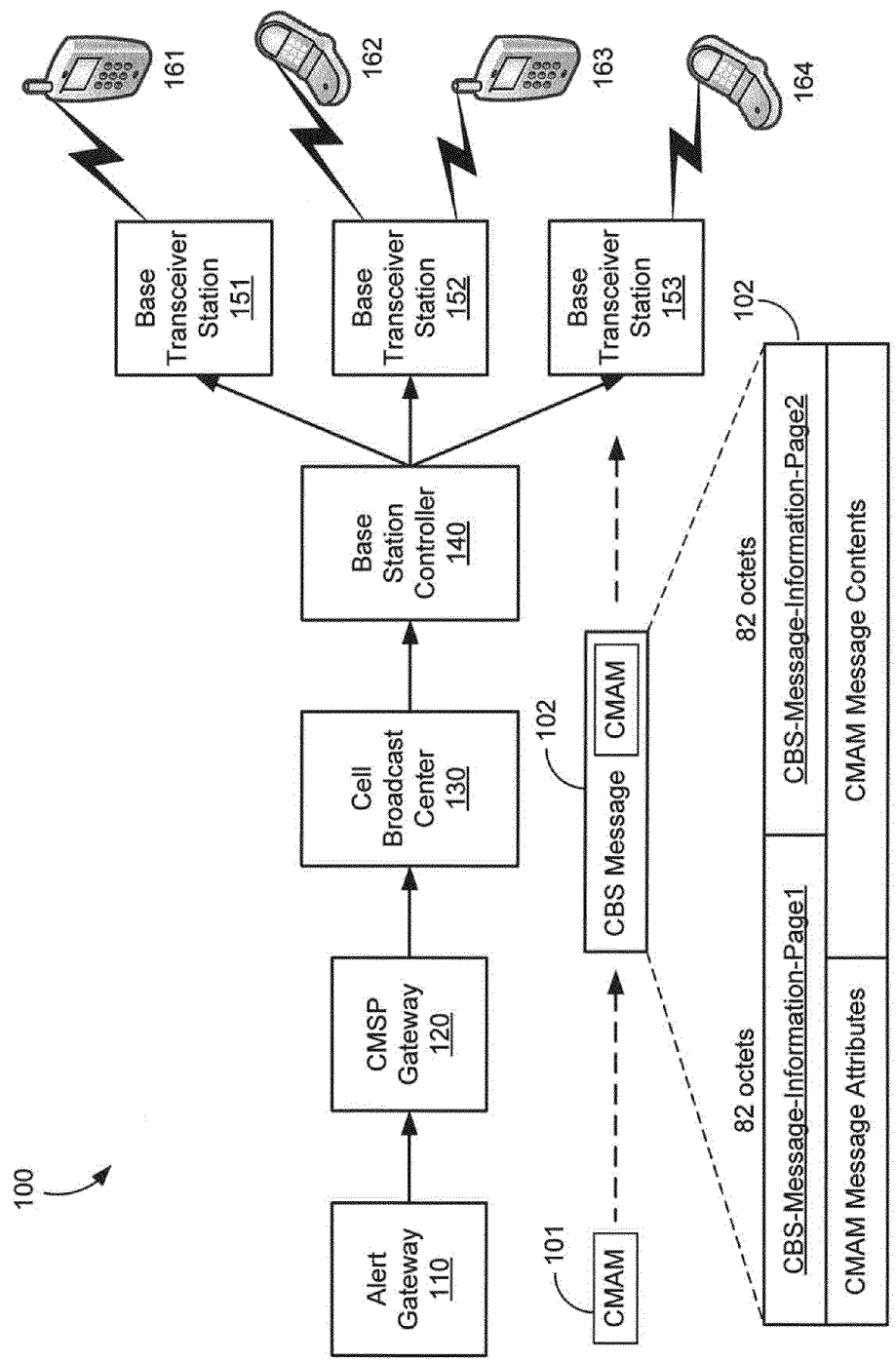
FIG. 1 is a block diagram of a non-limiting, exemplary system architecture in which mapping of commercial mobile alert service messages to cell broadcasts may be implemented.

FIG. 1 illustrates an exemplary architecture 100 that may be used to provide emergency alerts to mobile devices using GSM technologies. An alert generated by a governmental or emergency services agency may be referred to as a Commercial Mobile Alert Message (CMAM). CMAM 101 may be generated at or otherwise provided to a wireless carrier or wireless service provider, referred to herein as a Commercial Mobile Service Provider (CMSP), by Alert Gateway 110, which may be a Commercial Mobile Alert System (CMAS) alert gateway, and may be operated by a governmental or emergency services agency. Alert Gateway 110 may transmit CMAM 101 to CMSP Gateway 120. CMSP Gateway 120 may be dedicated to receiving CMAMs from one or more alert gateways such as Alert Gateway 110, and may communicate with Alert Gateway 110 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 101 may be transmitted from Alert Gateway 110 to CMSP Gateway 120, and may be based on Common Alert Protocol (CAP) key fields. A CMAM may be of various lengths. Upon receiving CMAM 101 from Alert Gateway 110, CMSP Gateway 120 may process CMAM 101, including formatting CMAM 101 as necessary to provide the alert to mobile devices serviced by the CMSP. Further processing may be performed to determine a set of the cells within the CMSP network that are to be provided with CMAM 101 for transmission to users and devices within that cell. In the event that multiple CMAMs are received by CMSP Gateway 120, CMSP Gateway 120 will process the CMAMs in a first-in first-out manner, except for Presidential Alert CMAMs, which may be processed before all other non-Presidential Alert CMAMs. Alternatively, other priority schemes may be used that determine CMAM priority based on various characteristics of CMAMs.

Once CMAM 101 is processed, CMSP Gateway 120 may transmit processed CMAM 101 to Cell Broadcast Center 130. In an alternative embodiment, CMAM 101 may not be altered by CMSP Gateway 120, and may be transmitted to Cell Broadcast Center 130 unchanged. Cell Broadcast Center 130 may transmit CMAM 101 to Base Station Controller 140 as a cell broadcast service (CBS) message containing the contents of CMAM 101, such as CBS Message 102. The contents of CMAM 101 and relevant data may be mapped to fields and/or parameters of a CBS message, such as a Write/Replace message of the Request/Indication primitive type as described in the 3GPP TS 23.041 v3.5.0 technical specification dated June 2006, which is hereby incorporated by reference in its entirety.

A cell broadcast, such as a Write/Replace message, may have individual parameters. Among the parameters of a Write/Replace message are CBS-Message-Information-Page parameters. There may be several of these parameters within an individual Write/Replace message. Such parameters are labeled CBS-Message-Information-Page1, CBS-Message-Information-Page2, and so forth through CBS-Message-Information-PageX for X number of CBS-Message-Information-Page parameters within an individual Write/Replace message. Each CBS-Message-Information-Page parameter within a Write/Replace message has a fixed length of 82 octets. If the contents of a CBS-Message-Information-Page parameter are less than 82 octets, the parameter is padded to 82 octets.

Also among the parameters of a Write/Replace message is a CBS-Message-Information-Length parameter that specifies the number of octets of actual data in an associated CBS-Message-Information-Page block. For example, CBS-Message-Information-Length1 parameter will indicate the number of octets within a CBS-Message-Information-Page1 parameter. Another parameter of a Write/Replace message is a Number of Pages parameter that indicates the total number of CBS-Message-Information-Page parameters in a Write/Replace message. In one embodiment, GSM/UMTS cell broadcasts may contain up to fifteen CBS-Message-Information-Page parameters in a single Write/Replace message.

In one embodiment, CMAM 101 may include attributes required by a user or network device to perform functions such as processing the CMAM, handling subscriber opt-out capability, handling duplicate messages, handling message expiration, etc. CMAM 101 may also include contents which may be intended for viewing, use, presentation, etc., by end users. Such contents may be text, audio, video, or any other means of providing information to a user. In one embodiment, CMAM 101 may be a total of 120 octets in length, with 120-N octets available for contents, where 'N' represents the number of octets used for attributes.

CMAM 101 contents and attributes may be mapped into the CBS-Message-Information-Page1 and CBS-Message-Information-Page2 parameters of a Write/Replace message. CMAM 101 attributes, which may be referred to as "header" information, may be mapped to or embedded within a CBS-Message-Information-Page1 parameter of a Write/Replace message such as CBS Message 102. The remaining octets of CMAM 101, which may contain the contents of CMAM 101 intended for viewing by end users, may be mapped to or embedded in the remaining octets of the CBS-Message-Information-Page1 parameter of CBS Message 102. If the combined attributes and contents of CMAM 101 exceed the 82 octets available in the CBS-Message-Information-Page1 parameter, the remaining contents of CMAM 101 may be embedded in or mapped to CBS-Message-Information-Page2 parameter of CBS message 102, as seen in FIG. 1.

Upon receipt of CBS Message 102, Base Station Controller 140 may transmit CBS Message 102 to the appropriate base stations, such as Base Transceiver Stations 151, 152, and 153. Base Transceiver Stations 151, 152, and 153 may transmit CBS Message 102 to mobile equipment (ME) such as wireless devices 161, 162, 163, and 164, thereby alerting the users of these devices to the contents of CMAM 101 represented by or contained with CBS message 102.

Figure 2:
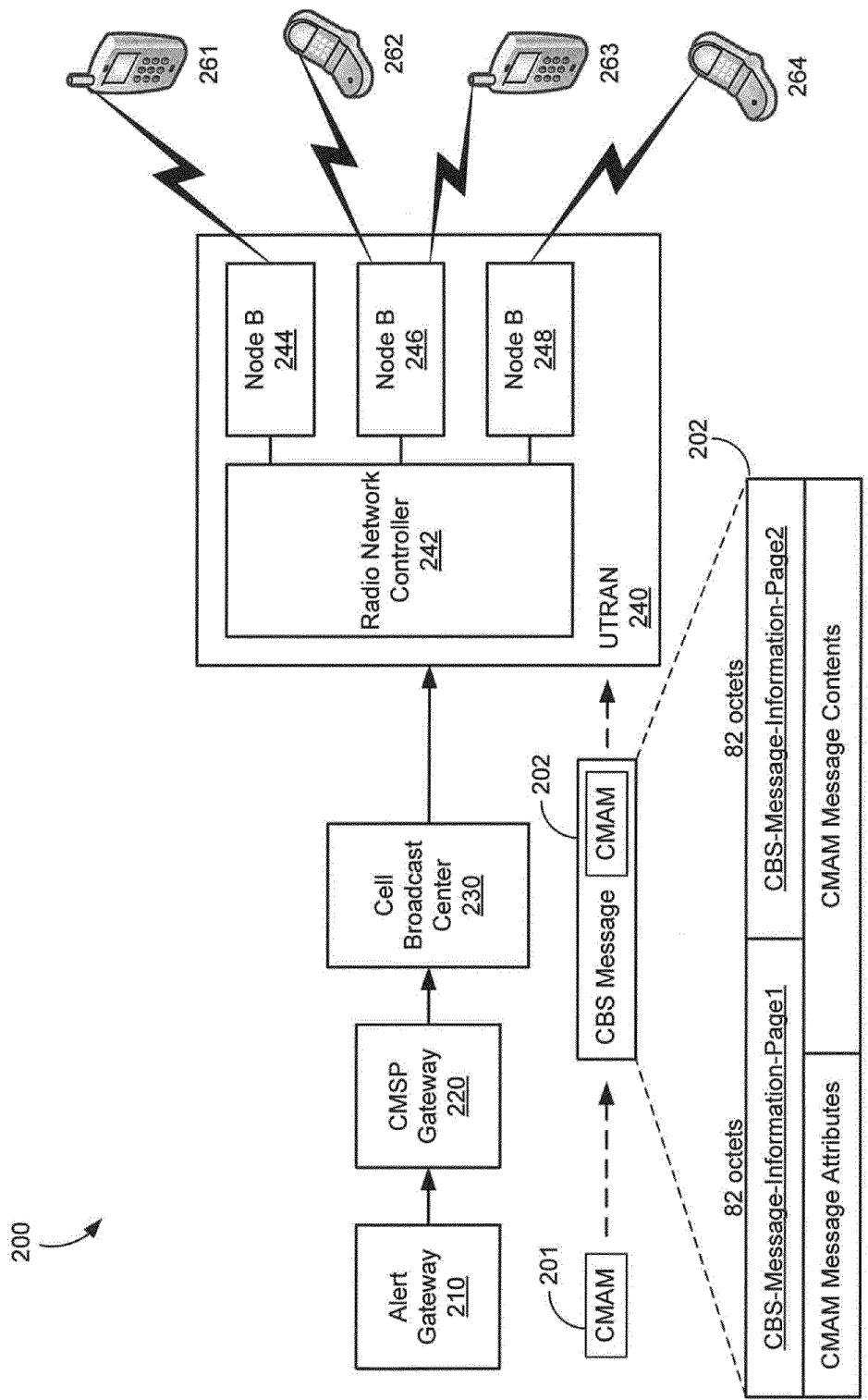
FIG. 2 is another block diagram of a non-limiting, exemplary system architecture in which mapping of commercial mobile alert service messages to cell broadcasts may be implemented.

FIG. 2 illustrates an exemplary architecture 200 that may be used to provide emergency alerts to mobile devices using UMTS technologies. CMAM 201 may be generated at or otherwise provided to a CMSP by Alert Gateway 210, which may be operated by a governmental or emergency services agency. Alert Gateway 210 may transmit CMAM 201 to CMSP Gateway 220. CMSP Gateway 220 may be dedicated to receiving CMAMs from one or more alert gateways such as Alert Gateway 210, and may communicate with Alert Gateway 210 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 201 may be transmitted from Alert Gateway 210 to CMSP Gateway 220 and may be based on Common Alert protocol (CAP) key fields. As with FIG. 1, a CMAM may be of various lengths. In one embodiment, CMAM 201 may be up to 120 octets in length. Upon receiving CMAM 201 from Alert Gateway 210, CMSP Gateway 220 may process CMAM 201, including formatting CMAM 201 as necessary to provide the alert to mobile devices serviced by the CMSP. Further processing may be performed to determine a subset of the cells within the CMSP network that are to be provided with CMAM 201 for transmission to users and devices within that cell. In the event that multiple CMAMs are received by CMSP Gateway 220, CMSP Gateway 220 may prioritize the multiple CMAMs as described above in regard to FIG. 1 and CMSP Gateway 120.

Once CMAM 201 is processed, CMSP Gateway 220 may transmit processed CMAM 201 to Cell Broadcast Center 230. In an alternative embodiment, CMAM 201 may not be altered by CMSP Gateway 220, and may be transmitted to Cell Broadcast Center 230 unchanged. Cell Broadcast Center 230 may transmit CMAM 201 to UMTS Terrestrial Radio Access Network (UTRAN) 240 as a cell broadcast service (CBS) message containing the contents of CMAM 201, such as CBS Message 202. The contents of CMAM 201 and relevant data may be mapped to fields and/or parameters of a CBS message, such as a Write/Replace message of the Request/Indication primitive type as described in the 3GPP TS 23.041 technical specification.

As with the system illustrated in FIG. 1, the contents of a CMAM may be mapped into the CBS-Message-Information-Page1 and CBS-Message-Information-Page2 parameters of a Write/Replace message. CMAM 201 attributes, which may be referred to as "header" information, may be mapped to or embedded within a CBS-Message-Information-Page1 parameter of a Write/Replace message such as CBS Message 202. The remaining octets of CMAM 201, which may contain the message contents of CMAM 201, may be mapped to or embedded in the remaining octets of the CBS-Message-Information-Page1 parameter of CBS Message 202. If the combined attributes and contents of CMAM 201 exceed the 82 octets available in the CBS-Message-Information-Page1 parameter, the remaining contents of CMAM 201 may be embedded in or mapped to CBS-Message-Information-Page2 parameter of CBS message 202, as seen in FIG. 2.

UTRAN 240 may include Radio Network Controller 242, which may provide control functionality for Node Bs 244, 246, and 248. As known to those skilled in the art, Node Bs in a UMTS network provide the function of base transceiver stations. Node Bs 244, 246, and 248 may transmit CBS message 202 to mobile equipment (ME) such as wireless devices 261, 262, 263, and 264, thereby alerting the users of these devices to the contents of CMAM 201 represented by or contained within CBS message 202.

In one embodiment, a number of attributes of a CMAM, such as CMAM 101 or CMAM 201, may be mapped to the CBS-Message-Information-Page1 parameter of a Write/Replace message such as CBS Message 102 or 202. Shown in Table 1 below are attributes that may be present in some embodiments and their respective functions, number of values (if applicable), and minimum length in octets. In an embodiment that uses all the attributes shown in Table 1, the total number length of the header, or the section of a CMAM containing such attributes, is 27 octets when each attribute is provided at least one octet. For example, while the msgType attribute shown below only takes four bits, an entire octet may be assigned to represent the msgType attribute. When implemented in this manner, there will be 55 octets remaining of the CBS-Message-Information-Page1 and the entire 82 octets of CBS-Message-Information-Page2 for the contents of a CMAM.

TABLE 1

CMAM Attributes

| Parameter | Function | Number of Values | Minimum Length |
|---|---|---|---|
| Identifier | A number uniquely identifying this message. | | 2 octets |
| Presidential Indication | Identifies the originator of this alert was the President | 1 | 1 bit |
| msgType | Code Values:<br>"Alert" - Initial information requiring attention by targeted recipients<br>"Update" - Updates and supersedes the earlier message(s) identified in <references><br>"Cancel" - Cancels the earlier message(s) identified in <references> | 3 | 4 bits |
| Associated Msg Identifier | Optional element (see CAP references). The message identifier(s) of an earlier CAP message or messages referenced by this one. | 1 | 2 octets |
| language | The language of the message encoded in accordance with the "Data Coding Scheme" parameter of the GSM/UMTS Write-Replace Request/Indication. | | 1 octet |
| CMA category | Code Values:<br>"Geo" - Geophysical (inc. landslide)<br>"Met" - Meteorological (inc. flood)<br>"Safety" - General emergency and public safety<br>"Security" - Law enforcement, military, homeland and local/private security<br>"Rescue" - Rescue and recovery<br>"Fire" - Fire suppression and rescue<br>"Health" - Medical and public health<br>"Env" - Pollution and other environmental<br>"Transport" - Public and private transportation<br>"Infra" - Utility, telecommunication, other non-transport infrastructure<br>"CBRNE" - Chemical, Biological, Radiological, Nuclear or High-Yield Explosive threat or attack<br>"Other" - Other events | 12 | 1 octet |
| responseType | Optional Element. Code Values:<br>"Shelter" - Take shelter in place or per <instruction><br>"Evacuate" - Relocate as instructed in the <instruction><br>"Prepare" - Make preparations per the <instruction><br>"Execute" - Execute a pre-planned activity identified in <instruction><br>"Monitor" - Attend to information sources as described in <instruction><br>"Assess" - Evaluate the information in this message. (This value should not be used in public warning applications.)<br>"None" - No action recommended | 7 | 1 octet |
| urgency | Code Values:<br>"Immediate" - Responsive action should be taken immediately | 2 | 3 bits |

TABLE 1-continued

CMAM Attributes

| Parameter | Function | Number of Values | Minimum Length |
|---|---|---|---|
| severity | "Expected" - Responsive action should be taken soon (within next hour) Code Values: "Extreme" - Extraordinary threat to life or property "Severe" - Significant threat to life or property | 2 | 3 bits |
| certainty | Code Values: "Observed" - Determined to have occurred or to be ongoing. "Likely" - Likely (p > ~50%) | 2 | 3 bits |
| CMAS Event Code | An event code similar to the Specific Area Message Encoding (SAME) Codes to indicate the type of event | 27 | 1 octet |
| expires | The expiry time of the information of the alert message. The date and time is represented in [dateTime] format (e.g., "2002-05-24T16:49:00-07:00" for 24 May 2002 at 16:49 PDT) and encoded according to GSM date/time format. | | 8 octets |
| protocol version | Protocol version | | 1 octet |
| Associated multimedia indicator | Indicates that there is associated multimedia information for this alert available in other profiles | | 2 octets |
| CMSP defined parameter | For CMSP carrier use only | | 1 octet |
| Reserved | Reserved for future use | | 2 octets |

Figure 3:
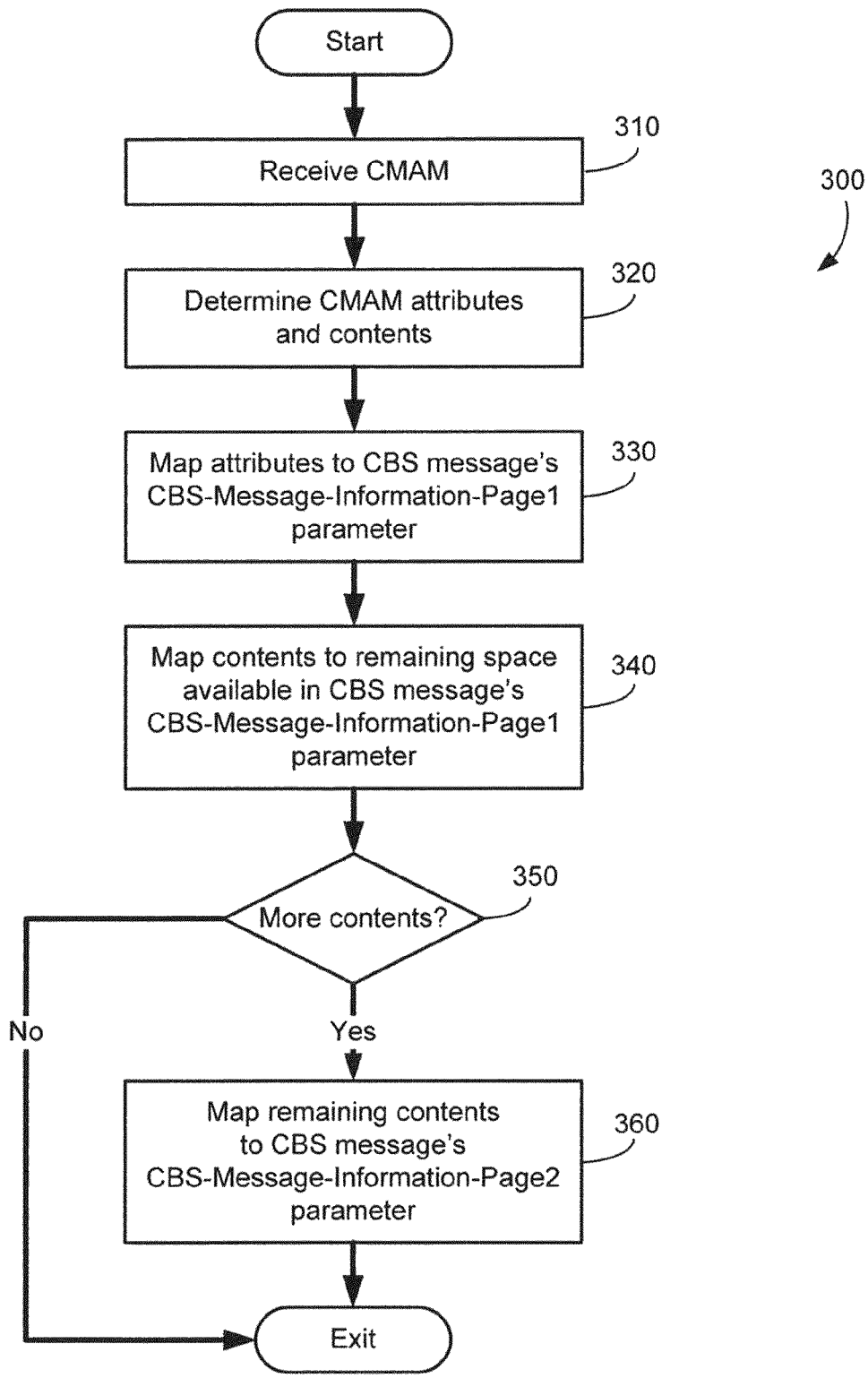
FIG. 3 is a flow chart of a non-limiting, exemplary method of processing a commercial mobile alert service message.

In FIG. 3, method 300 of mapping CMAM attributes and contents to a CBS message is illustrated. Method 300 may be performed by computing equipment or devices of any type, including a cell broadcast center such as Cell Broadcast Centers 130 and 230, a CMSP gateway such as CMSP Gateways 120 or 220, or any other type of network device. At block 310, a CMAM as described herein is received at a device. The CMAM may be received over a wired network connection, but may also be received wirelessly through wireless technology such as GSM and UTMS, WiFi, WiMAX, Long Term Evolution (LTE), or any other wireless communications means.

At block 320, the receiving device, in one embodiment operating software installed on such device, may determine the CMAM attributes, or header, and the contents of the CMAM. This may be accomplished using any effective means. In one embodiment, the contents of the CMAM include the text or other content intended for presentation to end users, while the attributes or header of a CMAM includes attributes needed by a user or network device to perform functions such as processing the CMAM, handling subscriber opt-out capability, handling duplicate messages, handling message expiration, etc. The attributes may be one or more of the attributes described herein, and the contents of the received CMAM may be any type of contents. At block 330, in the process of creating a CBS message or other type of cell broadcast message, the attributes, or header, of the received CMAM are mapped or otherwise replicated in a field of a CBS message. In one embodiments, the attributes of the CMAM are mapped to the CBS-Message-Information-Page1 parameter of a Write/Replace message. Other field or parameter mappings are contemplated as within the scope of the present disclosure.

At block 340, the contents of the CMAM are mapped to the remaining space available in the parameter of the cell broadcast message in which attributes were mapped at block 330. In one embodiment, the contents of the CMAM are mapped into the remaining space available in the CBS-Message-Information-Page1 parameter of a Write/Replace message. In such an embodiment, the CBS-Message-Information-Page1 parameter of a Write/Replace message may only have 82 octets of space available for data. Therefore, at block 350, a determination is made as to whether there are further contents of the CMAM that did not fit into the CBS-Message-Information-Page1 parameter.

If, at block 350, it is determined that the entirety of the CMAM contents and the CMAM attributes were mapped into the first cell broadcast message field, such as the CBS-Message-Information-Page1 parameter, then method 300 is complete. However, if at block 350 it is determined that more contents of the CMAM are available and require mapping to the cell broadcast message, then at block 360 such contents are mapped or otherwise replicated in a second field or parameter of the cell broadcast message. In one embodiment, the remaining contents are mapped to a CBS-Message-Information-Page2 parameter of a Write/Replace message. Other fields or parameters may be used to receive the remaining contents, and all such embodiments are contemplated as within the scope of the present disclosure. Once the remaining contents are mapped to a second field or parameter, method 300 is complete.

Note that in some embodiments, the determination of whether and how much of the contents of a CMAM can be mapped to a first parameter and a second parameter may be performed at any point. For example, upon receipt of the CMAM, a device may determine a total length of the CMAM and/or whether the entire CMAM (attributes and contents) can fit into one parameter or whether two parameters will be needed. Calculations, such as the number of octets, bits, space, etc. required of each cell broadcast message parameter needed to contain the CMAM attributes and contents may be performed at any point in the process, and by any device. All such embodiments are contemplated as within the scope of the present disclosure.

By using existing GSM and UTMS cell broadcast means to transmit CMAMs, CMSP operators may easily and effectively work with the CMAS to provide alerts to their users. The above described embodiments may be implemented using any type of devices, network elements, network connections, and any combination thereof. Described below are exemplary device and network embodiments that may be used to implement the methods and systems described above. As those skilled in the art will appreciate, alternative means and methods of mapping the attributes and contents of CMAS messages (CMAMs) to cell broadcasts may be used and all such means and methods are contemplated as within the scope of the present disclosure.

Figure 4:
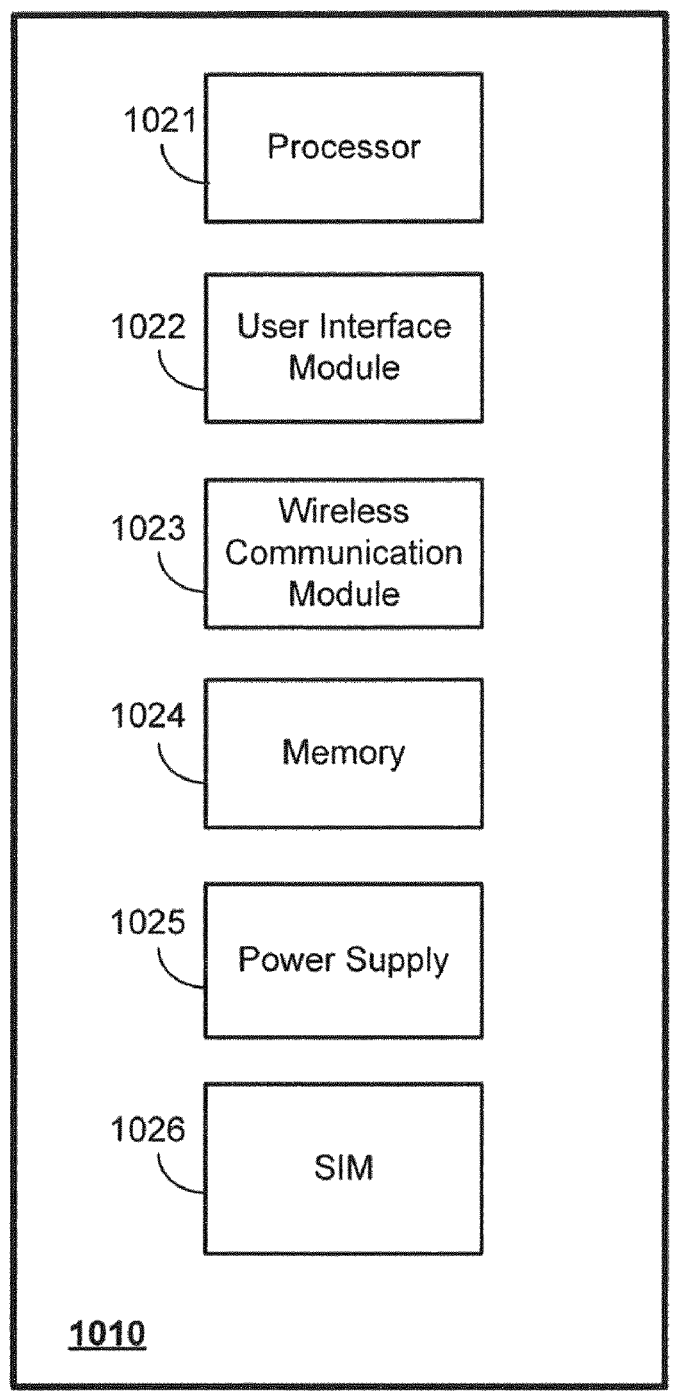
FIG. 4 is a block diagram of a non-limiting, exemplary wireless device that may be used in connection with an embodiment.

FIG. 4 illustrates an example wireless device 1010 that may be used in connection with an embodiment. References will also be made to other figures of the present disclosure as appropriate. For example, wireless devices 161-164 and 261-264 may each be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to transmitting and receiving telephonic communications including CBS messages and/or CMAMs in some form, communicating with, operating, or interfacing with CMSP, and/or running software configured to operate, communicate, or interface with CMSP, for example. User interface module 1022 may be any type or combination of hardware and/or software that enables a user to operate and interact with wireless device 1010, and, in one embodiment, to interact with a system or software enabling the user to view, modify, or delete a CBS message such as those containing CMAM data as described herein, and/or a system or software enabling the user to view, modify, or delete related software objects. For example, user interface module 1022 may include a display, physical and "soft" keys, voice recognition software, microphone, speaker and the like. Wireless communication module 1023 may be any type or combination of hardware and/or software that enables wireless device 1010 to communicate with CMSP equipment, for example, Base Transceiver Stations 151-153, Node Bs 244, 246, and 248, or any other type of wireless communications network or network equipment. Memory 1024 enables wireless device 1010 to store information, such as CBS message and/or CMAM preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
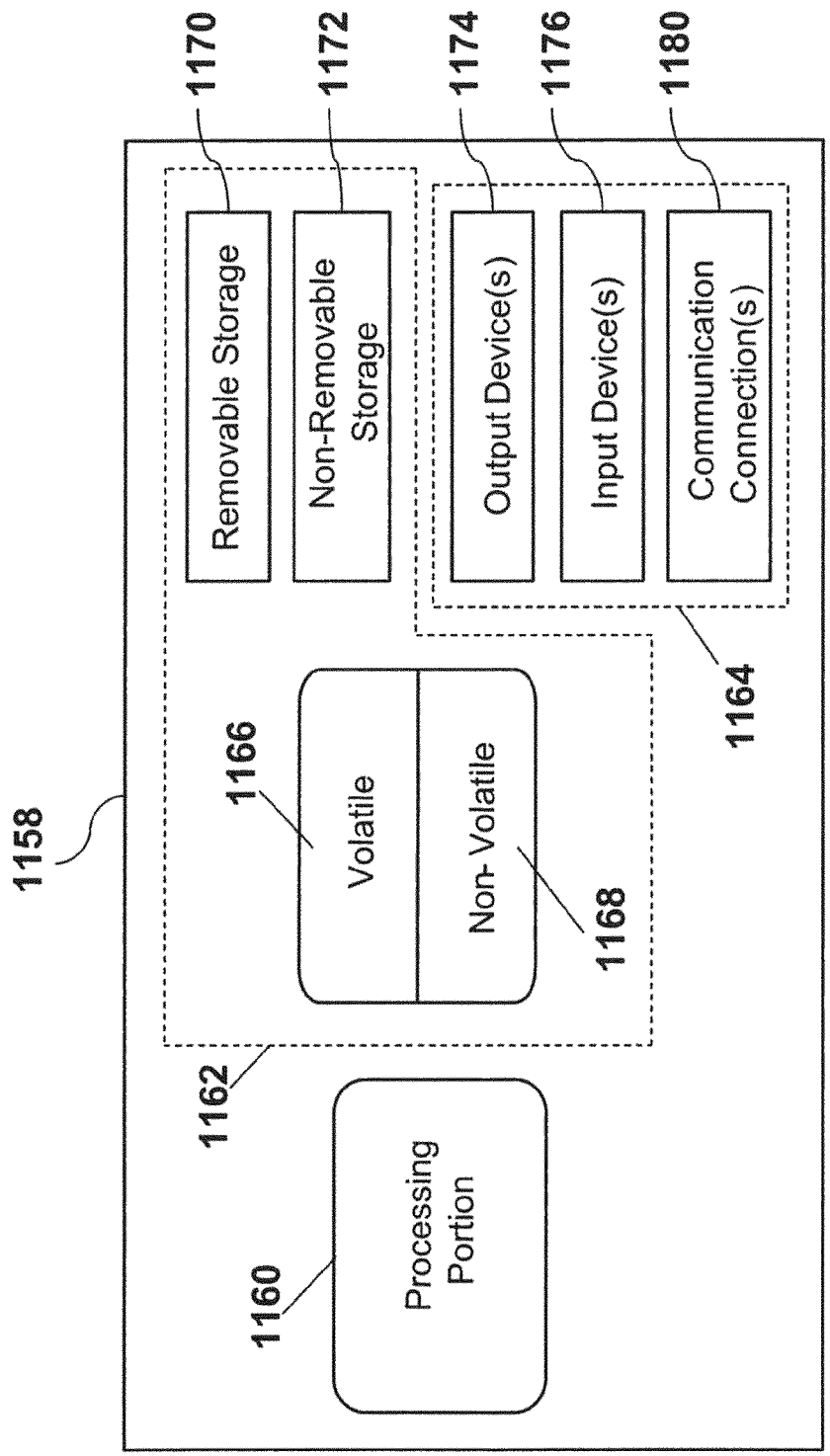
FIG. 5 is a block diagram of a non-limiting, exemplary processor in which the present subject matter may be implemented.

FIG. 5 is a block diagram of an example processor 1158 which may be employed in any of the embodiments described herein, including as one or more components of wireless devices 161-164 and 261-264, as one or more components of CMSP equipment or related equipment, such as any component shown in FIGS. 1 and 2, and/or as one or more components of any third party system or subsystem that may implement any portion of the subject matter described herein, such as Alert Gateway 110 or 210. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components, commands, and/or instructions, utilized to, for example, map CMAMs to CBS messages or any other type of cell broadcast or wireless communications means.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing CMAMs or cell broadcasts, message display applications, telephonic communications, etc. For example, the memory portion is capable of user preferences and/or software capable of processing CMAMs and cell broadcast messages. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through CMSP equipment as illustrated in FIGS. 1 and 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

CMSP networks and equipment as illustrated in FIGS. 1 and 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how cell broadcasts may be implemented with stationary and non-stationary network structures and architectures in order to map CMAS messages, such as CMAMs, to cell broadcasts. It can be appreciated, however, that methods and systems for mapping CMAMs to cell broadcasts such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for mapping CMAS messages to cell broadcasts can be applied independently of the method of data transport, and do not depend on any particular network architecture, or underlying protocols.

Figure 6:
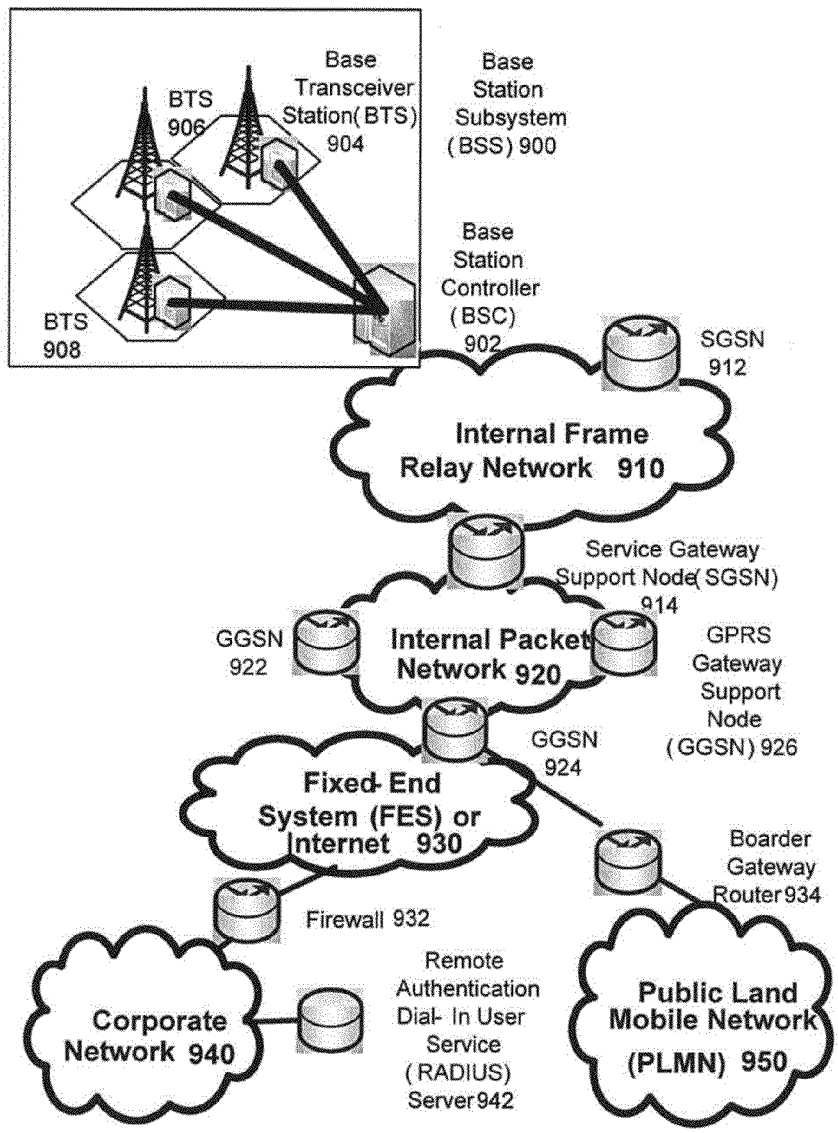
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which the systems and methods for mapping CMAS messages to cell broadcasts such as those described herein can be practiced. In an example configuration, the CMSP equipment as illustrated in FIGS. 1 and 2 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 161-164 and 261-264) become connected to the wireless network. In exemplary fashion, the packet traffic originating from user devices (e.g., wireless devices 161-164 and 261-264) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
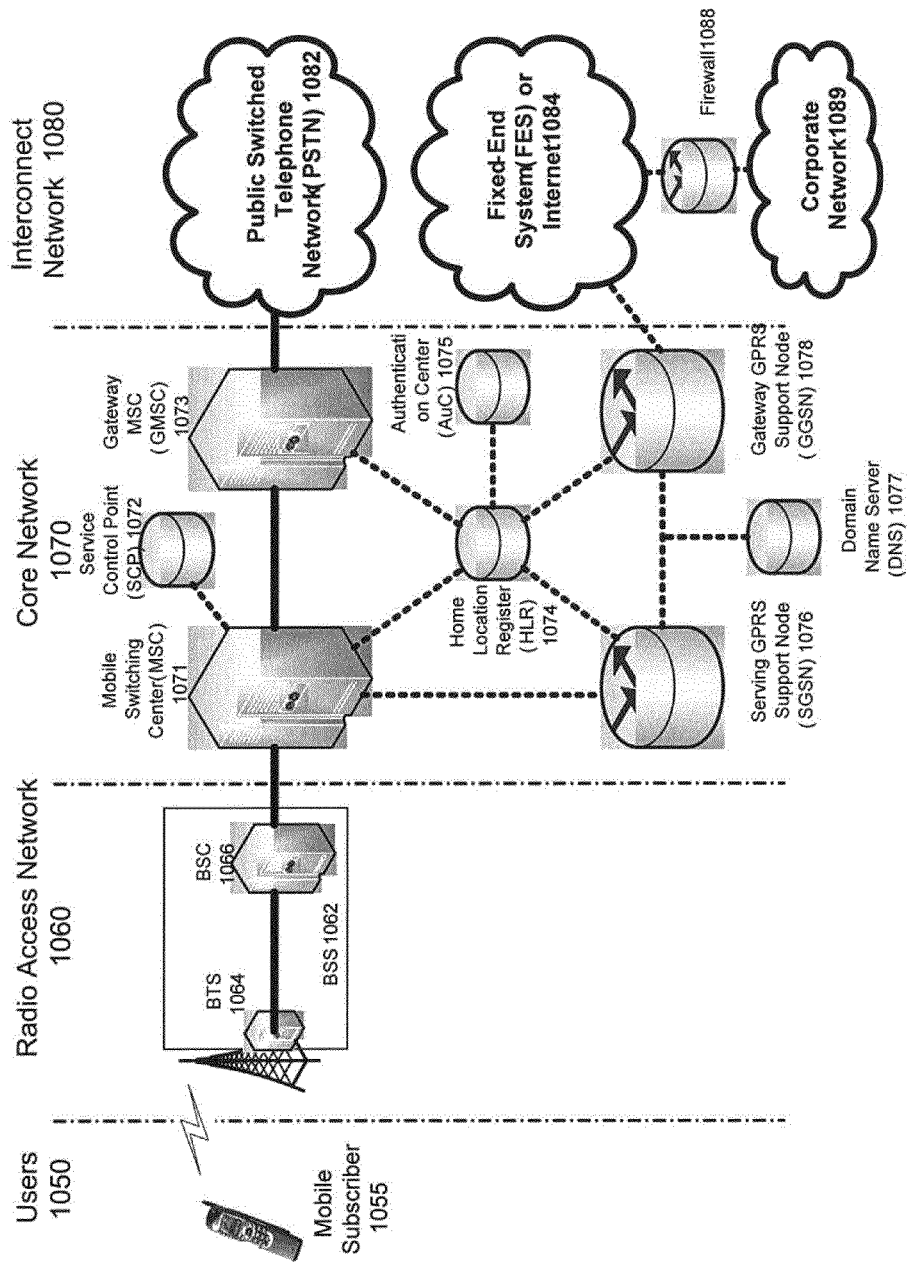
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise wireless devices 161-164 and 261-264. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 161-164 and 261-264, used by an end user of the mobile cellular service or a CMSP. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality mapping CMAS messages to cell broadcasts such as those described herein can include but are not limited to Gateway GPRS Support Node tables, Fixed End System router tables, firewall systems, VPN tunnels, and any number of other network elements as required by the particular digital network.

Figure 8:
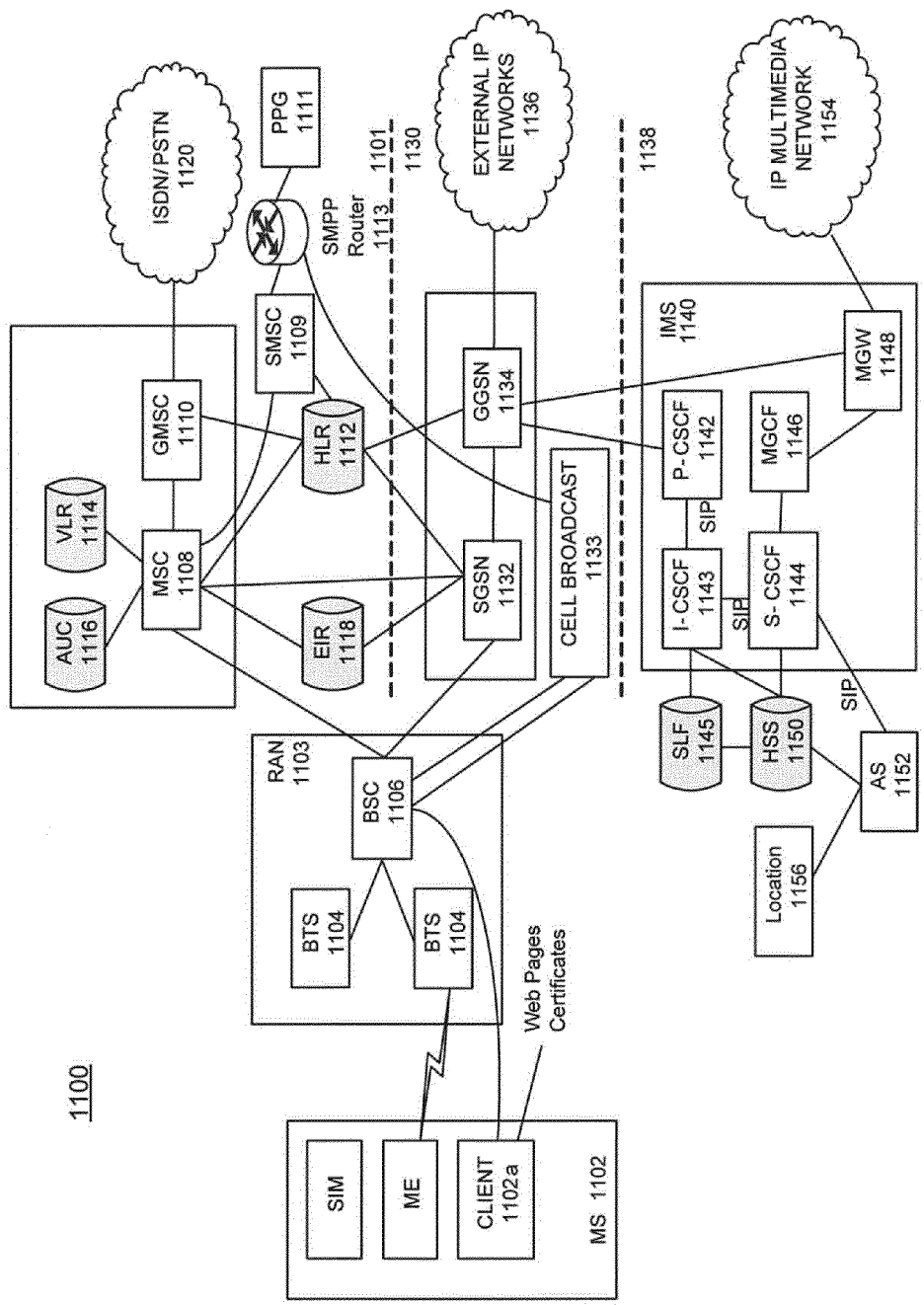
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which the systems and methods for mapping CMAS messages to cell broadcasts such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 161-164 and 261-264) that is used by mobile subscribers, on one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include CMAS message mapping and processing preferences. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain CMAS message mapping and processing preferences. The HLR 1112 and the VLR 1114, together with the MSC 1108, may provide the call routing and roaming capabilities of GSM, as well as CMAS message mapping functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile, including CMAS message preferences, and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for mapping CMAS messages to cell broadcasts such as those described herein have been described in connection with various communications devices and computing devices/processors, the underlying concepts can be applied to any communications or computing device, processor, or system capable of implementing the CMAS message mapping systems and methods described. The various techniques described herein can be implemented in connection with hardware or software or, where appropriate, with a combination of both. Thus, the methods and apparatuses for CMAS message mapping systems and methods, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for CMAS message mapping. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for CMAS message mapping as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a CMAS message mapping system. When implemented on a general-purpose processor, the program code combines with the processor to provide a unique apparatus that operates to invoke the functionality of a CMAS message mapping system. Additionally, any storage techniques used in connection with a CMAS message mapping system can invariably be a combination of hardware and software.

While the systems and methods for mapping CMAS messages to cell broadcasts have been described in connection with the various embodiments of the various figures, it is to be understood that other similar embodiments can be used or modifications and additions can be made to the described embodiments for performing the same functions of CMAS message mapping system without deviating from the described systems and methods. For example, one skilled in the art will recognize that a CMAS message mapping system as described in the present application may apply to any environment, whether wired or wireless, and may be applied to any number of such devices connected via a communications network and interacting across the network. Therefore, CMAS message mapping systems such as those described herein should not be limited to any single embodiment, but rather should be construed in breadth and scope in accordance with the appended claims.

What is claimed is:

1. A system comprising:
a memory comprising computer instructions;
a receiver configured to receive a commercial mobile alert message;
a processor coupled to the memory and the receiver, wherein when executing the computer instructions, the processor is configured to:
determine attributes of the commercial mobile alert message;
determine contents of the commercial mobile alert message;
map the attributes of the commercial mobile alert message to a first 27 octets of a CBS-Message-Information-Page1 parameter of a 3GPP Write/Replace message of Request/Indication primitive type; and
map at least a portion of the contents of the commercial mobile alert message to the CBS-Message-Information-Page1 parameter of the 3GPP Write/Replace message; and
a transmitter configured to transmit the 3GPP Write/Replace message.

2. The system of claim 1, wherein when executing the computer instructions, the processor is further configured to map at least a portion of the contents of the commercial mobile alert message to a CBS-Message-Information-Page2 parameter of the 3GPP Write/Replace message.

3. The system of claim 1, wherein the CBS-Message-Information-Page1 parameter has a fixed length.

4. The system of claim 3, wherein a combined length of the attributes of the commercial mobile alert message and the contents of the commercial mobile alert message is less than the fixed length of the CBS-Message-Information-Page1 parameter.

5. The system of claim 4, wherein the processor is further configured to fill the unused portion of the CBS-Message-Information-Page1 parameter.

6. The system of claim 3, wherein a combined length of the attributes of the commercial mobile alert message and the contents of the commercial mobile alert message is greater than the fixed length of the CBS-Message-Information-Page1 parameter.

7. The system of claim 6, wherein:
mapping the at least a portion of the contents of the commercial mobile alert message to the CBS-Message-Information-Page1 parameter of the 3GPP Write/Replace message comprises mapping a first portion of the contents of the commercial mobile alert message to the CBS-Message-Information-Page1 parameter of the 3GPP Write/Replace message;
the first portion is a length equal to a portion of the CBS-Message-Information-Page1 parameter that is unused after the attributes of the commercial mobile alert message have been mapped to the CBS-Message-Information-Page1 parameter;
wherein when executing the computer instructions, the processor is configured to map a second portion of the contents of the commercial mobile alert message to a CBS-Message-Information-Page2 parameter of the 3GPP Write/Replace message; and
the second portion is a portion of the contents of the commercial mobile alert message that has not been mapped to the CBS-Message-Information-Page1 parameter.

8. The system of claim 1, wherein the processor is further configured to prioritize the commercial mobile alert message among a plurality of commercial mobile alert messages.

9. The system of claim 1, wherein the attributes of the commercial mobile alert message comprise an attribute that causes a user mobile device to filter the 3GPP Write/Replace message.

10. A method comprising:
receiving a commercial mobile alert message from an alert gateway at a cell broadcast center;
determining attributes of the commercial mobile alert message at the cell broadcast center;
determining contents of the commercial mobile alert message at the cell broadcast center;
generating a 3GPP Write/Replace message of a Request/Indication primitive type by mapping the attributes of the commercial mobile alert message to a first 27 octets of a CBS-Message-Information-Page1 parameter and mapping at least a first portion of the contents of the commercial mobile alert message to the CBS-Message-Information-Page1 parameter; and
transmitting the 3GPP Write/Replace message.

11. The method of claim 10, further comprising:
determining that the combined length of the contents of the commercial mobile alert message and the attributes of the commercial mobile alert message exceed a fixed length of the CBS-Message-Information-Page1 parameter; and
mapping a second portion of the contents of the commercial mobile alert message to a CBS-Message-Information-Page2 parameter of the 3GPP Write/Replace message, wherein the combined length of the first portion of the contents of the commercial mobile alert message and the attributes of the commercial mobile alert message are equal to a fixed length of the CBS-Message-Information-Page1 parameter.

12. The method of claim 10, further comprising prioritizing the commercial mobile alert message among a plurality of commercial mobile alert messages.

13. The method of claim 12, wherein prioritizing the commercial mobile alert message among the plurality of commercial mobile alert messages comprises first processing all Presidential Alert commercial mobile alert messages from among the plurality of commercial mobile alert messages and then processing non-Presidential Alert commercial mobile alert messages from among the plurality of commercial mobile alert messages in the order in which the non-Presidential Alert commercial mobile alert messages were received.

14. The method of claim 10, wherein the commercial mobile alert message is received over a wireless communications connection.

15. The method of claim 10, further comprising determining a subset of the cells within a network to which the 3GPP Write/Replace message is to be transmitted.

16. The method of claim 10, wherein transmitting the 3GPP Write/Replace message comprises transmitting the 3GPP Write/Replace message to a base station controller.

17. The method of claim 10, wherein transmitting the 3GPP Write/Replace message comprises transmitting the 3GPP Write/Replace message to a radio network controller.

18. The method of claim 10, further comprising mapping a second portion of the contents of the commercial mobile alert message to a CBS-Message-Information-Page2 parameter-of the 3GPP Write/Replace message and mapping a third portion of the contents of the commercial mobile alert message to a CBS-Message-Information-Page3 parameter-of the 3GPP Write/Replace message.

* * * * *